(12) United States Patent
Ichikawa et al.

(10) Patent No.: US 8,880,936 B2
(45) Date of Patent: Nov. 4, 2014

(54) METHOD FOR SWITCHING APPLICATION SERVER, MANAGEMENT COMPUTER, AND STORAGE MEDIUM STORING PROGRAM

(75) Inventors: Yujiro Ichikawa, Yokohama (JP); Yoshifumi Takamoto, Kokubunji (JP); Keisuke Hatasaki, Kawasaki (JP); Takashi Tameshige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 13/695,050

(22) PCT Filed: Aug. 26, 2010

(86) PCT No.: PCT/JP2010/064460
§ 371 (c)(1),
(2), (4) Date: Feb. 7, 2013

(87) PCT Pub. No.: WO2011/148524
PCT Pub. Date: Dec. 1, 2011

(65) Prior Publication Data
US 2013/0138998 A1    May 30, 2013

(30) Foreign Application Priority Data

May 28, 2010   (JP) .................................. 2010-122884

(51) Int. Cl.
*G06F 11/00*      (2006.01)
*G06F 11/20*      (2006.01)

(52) U.S. Cl.
CPC ............ *G06F 11/2025* (2013.01); *G06F 11/20* (2013.01)
USPC .......................................... 714/4.11; 714/6.3

(58) Field of Classification Search
USPC ........................................................ 714/4.11
See application file for complete search history.

(56) References Cited

U.S. PATENT DOCUMENTS

| | | | |
|---|---|---|---|
| 7,496,794 B1 * | 2/2009 | Eastham et al. .................. | 714/37 |
| 7,698,598 B1 * | 4/2010 | Harris .............................. | 714/37 |
| 8,190,946 B2 * | 5/2012 | Kojima ............................ | 714/10 |
| 2004/0003319 A1 * | 1/2004 | Ukai et al. ....................... | 714/25 |
| 2006/0143498 A1 | 6/2006 | Hatasaki et al. | |
| 2007/0180314 A1 * | 8/2007 | Kawashima et al. ............ | 714/15 |
| 2012/0233509 A1 * | 9/2012 | Kojima ............................ | 714/49 |

FOREIGN PATENT DOCUMENTS

| | | | |
|---|---|---|---|
| JP | 11-025023 | A | 1/1999 |
| JP | 11-085555 | A | 3/1999 |
| JP | 2004-030363 | A | 1/2004 |
| JP | 2006-011781 | A | 1/2006 |
| JP | 2006-163963 | A | 6/2006 |
| JP | 2006-227770 | A | 8/2006 |
| JP | 2007-207219 | A | 8/2007 |

* cited by examiner

*Primary Examiner* — Kamini Patel
(74) *Attorney, Agent, or Firm* — Volpe and Koenig, P.C.

(57) ABSTRACT

It is provided a management computer which refers to switching level information including switching patterns to be used at a time of switching the first task to the second application server; sets a level of a degree of safety for each of the switching patterns; refers to a stop time for each first task which is allowed upon switching the first task to the second application server; selects one of the switching patterns having a switching time that is shorter than the stop time of the task requirement information which is set to the first task and having the level of the degree of safety that is highest among the switching patterns of the switching level information; stops the second task of the second application server by the selected one of the switching patterns; and then controls the second application server to provide the first task.

15 Claims, 17 Drawing Sheets

SWITCHING LEVEL TABLE 221

| LEVEL | SWITCHING METHOD | REQUIRED TIME (SECOND) |
|---|---|---|
| 1 | SHUT DOWN DUE TO FAILURE SIGN DETECTION | 0 |
| 2 | FORCED POWER OFF | 30 |
| 3 | SHUT DOWN | 180 |
| 4 | VIRTUAL SERVER MIGRATION | 300 |

Fig. 6

TASK REQUIREMENT TABLE 220

| TASK IDENTIFIER | SWITCHING TIME REQUIREMENT (SECOND) |
|---|---|
| A | 60 |
| B | 600 |
| C | NULL |

Fig. 7

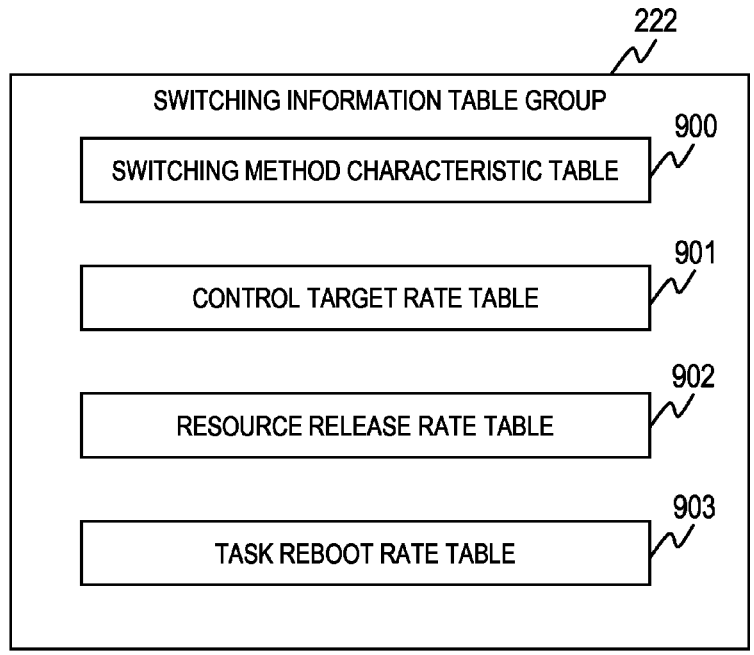

Fig. 9

SWITCHING METHOD CHARACTERISTIC TABLE 900

| SWITCHING METHOD | LEVEL DETERMINATION ELEMENTS | | |
| --- | --- | --- | --- |
| | CONTROL TARGET | RESOURCE RELEASE METHOD | TASK REBOOT |
| SHUT DOWN DUE TO FAILURE SIGN DETECTION | OS | STOPPING OF SERVER APPARATUS | REQUIRED |
| FORCED POWER OFF | HARDWARE | STOPPING OF SERVER APPARATUS | REQUIRED |
| SHUT DOWN | OS | STOPPING OF SERVER APPARATUS | REQUIRED |
| VIRTUAL SERVER MIGRATION | VIRTUALIZATION SYSTEM | CHANGING OF RESOURCE ALLOCATION RATE | NOT REQUIRED |

Fig. 10

CONTROL TARGET RATE TABLE 901

| CONTROL TARGET | RATE |
|---|---|
| OS | 2 |
| HARDWARE | 1 |
| VIRTUALIZATION SYSTEM | 3 |

RESOURCE RELEASE RATE TABLE 902

| RESOURCE RELEASE METHOD | RATE |
|---|---|
| STOPPING OF SERVER APPARATUS | 2 |
| CHANGING OF RESOURCE ALLOCATION RATE | 1 |

TASK REBOOT RATE TABLE 903

| TASK REBOOT | RATE |
|---|---|
| REQUIRED | 1 |
| NOT REQUIRED | 3 |

SWITCHING LEVEL INFORMATION SETTINGS (1700)

| LEVEL (1701) | SWITCHING METHOD (1702) | REQUIRED TIME (1703) |
|---|---|---|
| 1 ▼ | SHUT DOWN DUE TO FAILURE SIGN DETECTION | 0 sec |
| 2 ▼ | FORCED POWER OFF | 30 sec |
| 3 ▼ | SHUT DOWN | 180 sec |
| 4 ▼ | VIRTUAL SERVER MIGRATION | 300 sec |

OK (1704)   CANCEL (1705)

Fig. 18

TASK REQUIREMENT INFORMATION SETTINGS (1800)

| TASK (1801) | SWITCHING TIME REQUIREMENT (1802) |
|---|---|
| A | 0 sec |
| B | 30 sec |

OK (1803)   CANCEL (1804)

U.S. 8,880,936 B2

METHOD FOR SWITCHING APPLICATION SERVER, MANAGEMENT COMPUTER, AND STORAGE MEDIUM STORING PROGRAM

CROSS-REFERENCE TO RELATED APPLICATIONS

This application is the US national phase application of PCT Application PCT/JP2010/064460 filed on Aug. 26, 2010 and claims priority from Japan Priority Application 2010-122884, filed on May 28, 2010, the contents of which are hereby incorporated by reference into this application.

BACKGROUND OF THE INVENTION

This invention relates to a computer system including a failover configuration, and more particularly, to a technology for server switching including a procedure for determining a switching pattern for a server.

As a task recovery method to be used when a failure occurs in a server, there is switching means for a server (see, for example, JP 2006-163963 A, JP 2006-011781 A, and JP 2006-227770 A). As methods relating to effective use of a standby server in a failover configuration including such switching means for a server, there are known development and test in the standby server, and temporary allocation to a web server or the like.

SUMMARY OF THE INVENTION

With the above-mentioned conventional methods, however, a task running on a server of a standby system (for example, task of developing software) is temporarily stopped at a time of switching a server. This is because at the time of switching, for example, in order to prevent input/output (I/O) failure occurrence and update settings of a world wide name (WWN) and basic input/output system (BIOS), the server of the standby system needs to be temporarily stopped.

The above-mentioned fail-over method has an influence on a task running on the server of the standby system or a server of an active system at the time of switching a server. For example, when the server of the standby system is forcibly stopped for achieving quick switching, a hardware fault, corruption of task data, or the like may occur. When the server is switched after stopping of the task running on the server of the standby system is confirmed, recovery of the task running on the server of the active system may be delayed and a service level agreement (SLA) cannot be satisfied in some cases. This problem becomes particularly conspicuous under a situation in which a plurality of tasks having different requirements share the server of the standby system.

In view of the above, this invention has an object to determine a switching method for a server which stops a server of a standby system as safely as possible at a time of switching the server in order to satisfy a task requirement and suppress an influence of server switching on the server of the standby system, and to detect a failure sign of a server of an active system so as to stop the server of the standby system in advance.

The representative one of inventions disclosed in this application is outlined as follows. There is provided a method of switching an application server, for controlling to take over a first task provided by a first application server to a second application server, the method being executed by a management computer coupled to the first application server for providing the first task and the second application server for providing the second task. The method including: a first step of referring, by the management computer, to switching level information including switching patterns to be used at a time of switching the first task to the second application server, and setting a level of a degree of safety for each of the switching patterns; a second step of referring, by the management computer, to the switching level information, and setting a switching time for the each of the switching patterns, which is required for switching the first task to the second application server; a third step of referring, by the management computer, to task requirement information including a stop time for each first task which is allowed at the time of switching the first task to the second application server; a fourth step of comparing, by the management computer, the stop time included in the referred task requirement information which is set to the first task and the switching time which is set to the each of the switching patterns included in the referred switching level information, and selecting one of the switching patterns having a switching time that is shorter than the stop time of the task requirement information which is set to the first task and having the level of the degree of safety that is highest among the switching patterns of the switching level information; and a fifth step of stopping, by the management computer, the second task of the second application server by the selected one of the switching patterns, and then controlling the second application server to provide the first task.

Therefore, according to the embodiment of this invention, it is possible to determine the switching pattern for a server which stops the second application server (standby server) as safely as possible at the time of switching the server.

BRIEF DESCRIPTION OF THE DRAWINGS

FIG. 6 is an explanatory diagram illustrating an example of a switching level table according to the first embodiment of this invention.

FIG. 7 is an explanatory diagram illustrating an example of a task requirement table according to the first embodiment of this invention.

FIG. 9 is an explanatory diagram illustrating a configuration of the switching information table group according to the first embodiment of this invention.

FIG. 10 is an explanatory diagram illustrating a configuration of the switching method characteristic table according to the first embodiment of this invention.

FIG. 11 is an explanatory diagram illustrating a configuration of the control target rate table according to the first embodiment of this invention.

FIG. 12 is an explanatory diagram illustrating a configuration of the resource release rate table according to the first embodiment of this invention.

FIG. 13 is an explanatory diagram illustrating a configuration of the task reboot rate table according to the first embodiment of this invention.

FIG. 17 is an explanatory diagram illustrating an example of a GUI for setting details of the switching level information according to the first embodiment of this invention.

FIG. 18 is an explanatory diagram illustrating an example of a GUI for setting details of the task requirement information according to the first embodiment of this invention.

DETAILED DESCRIPTION OF THE PREFERRED EMBODIMENTS

Embodiments of this invention are described below with reference to the accompanying drawings.

First Embodiment

Figure 1:
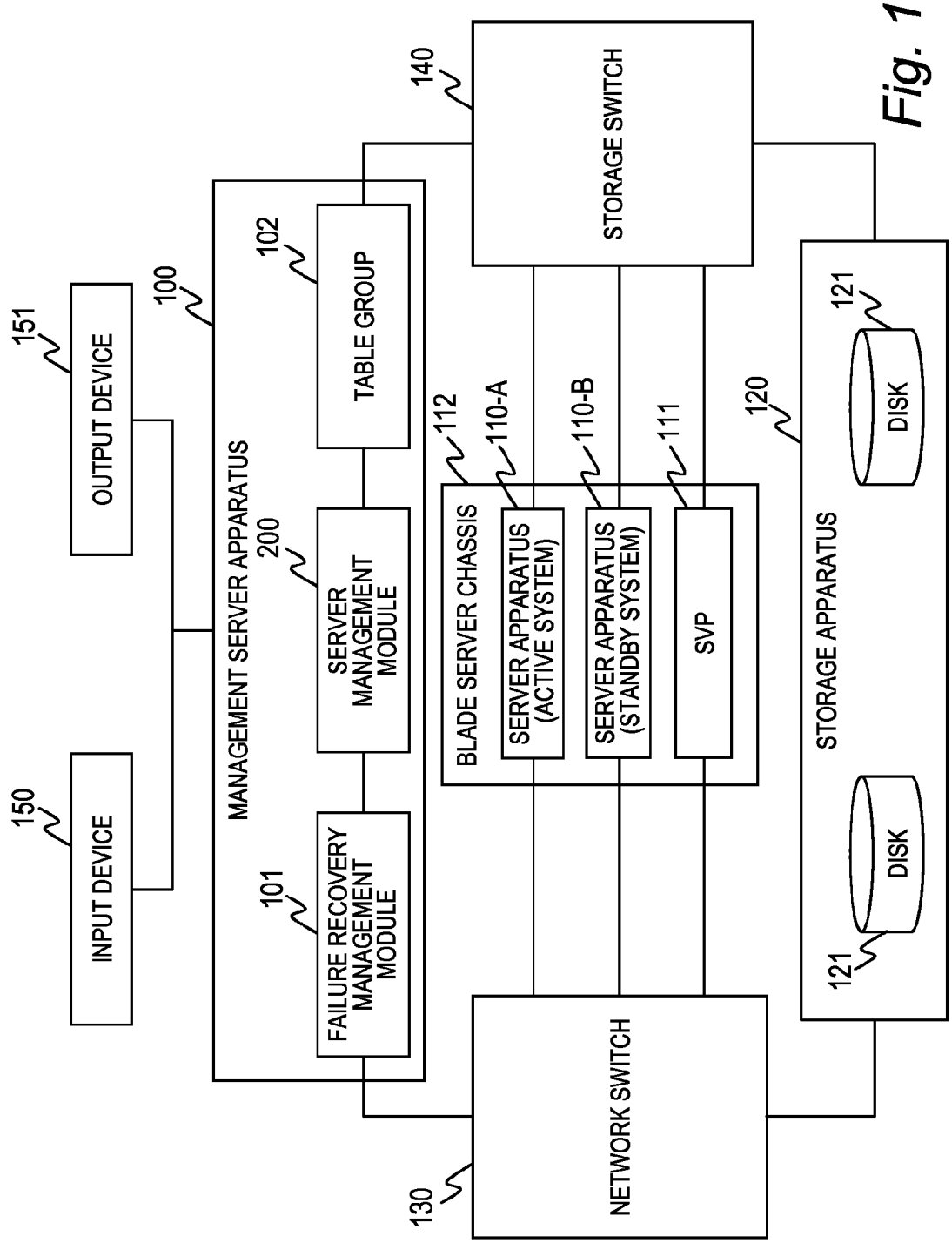
FIG. 1 is a block diagram illustrating a configuration of a computer system according to a first embodiment of this invention.

FIG. 1 illustrates a configuration of a computer system. The computer system includes a management server apparatus 100, at least one server apparatus 110-A and 110-B, a service processor (SVP) 111, a server chassis 112 for housing the server apparatus 110-A and 110-B and the SVP 111, a storage apparatus 120, at least one network switch 130, and at least one storage switch 140. It should be noted that in FIG. 1, the server apparatus 110-A functions as an active system, and the server apparatus 110-B functions as a standby system. Further, a plurality of the server apparatus 110-A and 110-B are collectively referred to as the server apparatus 110.

The management server apparatus 100 is a computer which operates under program control. The management server apparatus 100 is coupled to an input device 150 and an output device 151 which are used by a user of the management server apparatus 100 (administrator of the computer system), and includes a network interface card (NIC) which is coupled to the network switch 130 and a host bus adapter (HBA) which is coupled to the storage switch 140.

The management server apparatus 100 is coupled to the respective server apparatus 110, the SVP 111, and the storage apparatus 120 via the network switch 130 and the storage switch 140. The management server apparatus 100 puts a failure recovery management module 101 into operation, and includes a table group 102 which is required for the operation of the failure recovery management module 101. Tables included in the table group 102 are described later with reference to table configuration examples of FIG. 6 and the subsequent figures.

The server apparatus 110 is a computer which operates under program control and includes a network interface card (NIC) which is coupled to the network switch 130 and a host bus adapter (HBA) which is coupled to the storage switch 140. The server apparatus 110 is coupled to the management server apparatus 100, another server apparatus 110, the SVP 111, and the storage apparatus 120 via the network switch 130 and the storage switch 140.

The storage apparatus 120 is a storage apparatus system which is provided with a Fibre Channel (FC) interface and a LAN interface so as to be coupled to the storage switch 140 and the network switch 130, and includes at least one disks 121 to be used by the management server apparatus 100 and the server apparatus 110.

The network switch 130 is at least one network equipment. Specific examples of the network equipment include a network switch and router, a load balancer, and a firewall.

Figure 2:
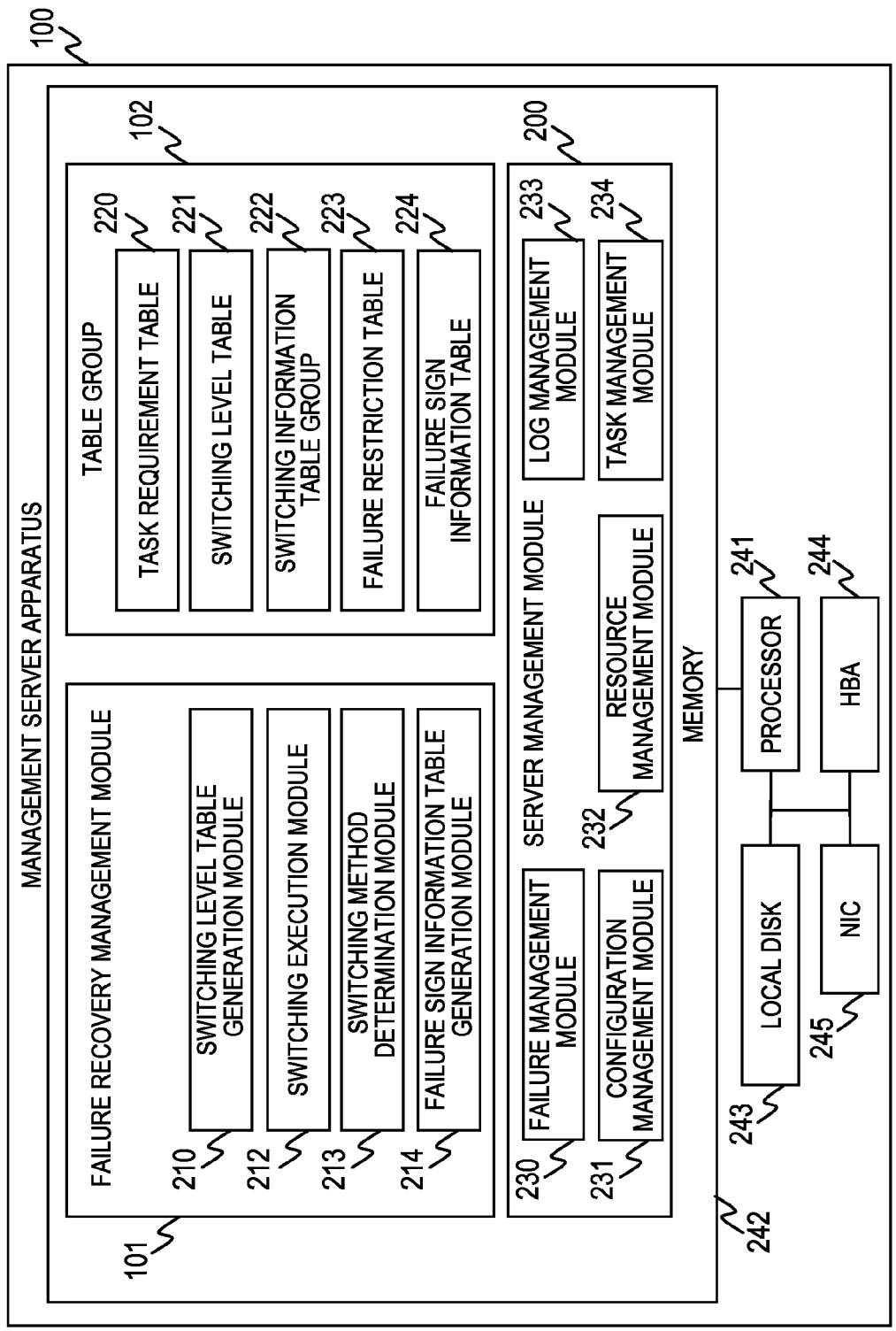
FIG. 2 is a block diagram illustrating a configuration of a management server apparatus according to the first embodiment of this invention.

FIG. 2 is a block diagram illustrating a configuration of the management server apparatus 100. The management server apparatus 100 includes a processor (CPU) 241 for executing arithmetic processing, a memory 242 for storing data and programs, a local disk 243 for retaining data and programs, an NIC 245 coupled to the network switch 130, and an HBA 244 coupled to the storage switch 140. It should be noted that the local disk 243 functions as a medium for storing the programs. On the memory 242, the failure recovery management module 101, the table group 102, and the server management module 200 are loaded.

The failure recovery management module 101 includes a switching level table generation module 210, a switching execution module 212, a switching method determination module 213, and a failure sign information table generation module 214. It should be noted that in the description of this embodiment, the failure recovery management module 101 and the server management module 200 are programs executed by the processor 241, but the failure recovery management module 101 and the server management module 200 may be implemented by hardware or firmware mounted on the management server apparatus 100 or a combination of hardware and firmware. Further, the failure recovery management module 101 and the server management module 200 are stored in an auxiliary storage device such as the local disk 243 included in the management server apparatus 100, and at the time of execution, the failure recovery management module 101 and the server management module 200 are loaded on the memory 242 and then executed by the processor 241.

A failure management module 230 detects a failure that has occurred in the respective server apparatus 110 (such as CPU temperature rise, abnormality in fan rpm, and memory ECC correcting error) based on information transmitted from the server apparatus 110 or the SVP 111.

The table group 102 includes a task requirement table 220, a switching level table 221, a switching information table group 222, a failure restriction table 223, and a failure sign information table 224. It should be noted that the failure restriction table 223 is a table to be used in a second embodiment. Further, the failure sign information table 224 is a table to be used in a third embodiment.

The server management module 200 includes the failure management module 230, a configuration management module 231, a resource management module 232, a log management module 233, and a task management module 234. The configuration management module 231 collects configuration information on the respective server apparatus 110 (such as host name, type of operating system, and device information) from the respective server apparatus 110 and retains the configuration information.

The resource management module 232 collects load information on the respective server apparatus 110 (such as CPU usage rate and memory usage amount) from the respective server apparatus 110 and retains the load information. The log management module 233 retains a history of switching executed in the past (such as identifier of a switching method 602 (switching pattern), start time, end time, target server apparatus, and target task). The task management module 234 collects and retains information on a task running on the respective server apparatus 110. It should be noted that the log management module 233 may retain, as information indicating a past record of switching executed in the past, the identifier of the switching method 602 (switching pattern) and a time period which was required for switching (required time). Further, as the required time for switching, an average value for each switching pattern executed in the past can be used, which is described later.

Figures 25, 26:
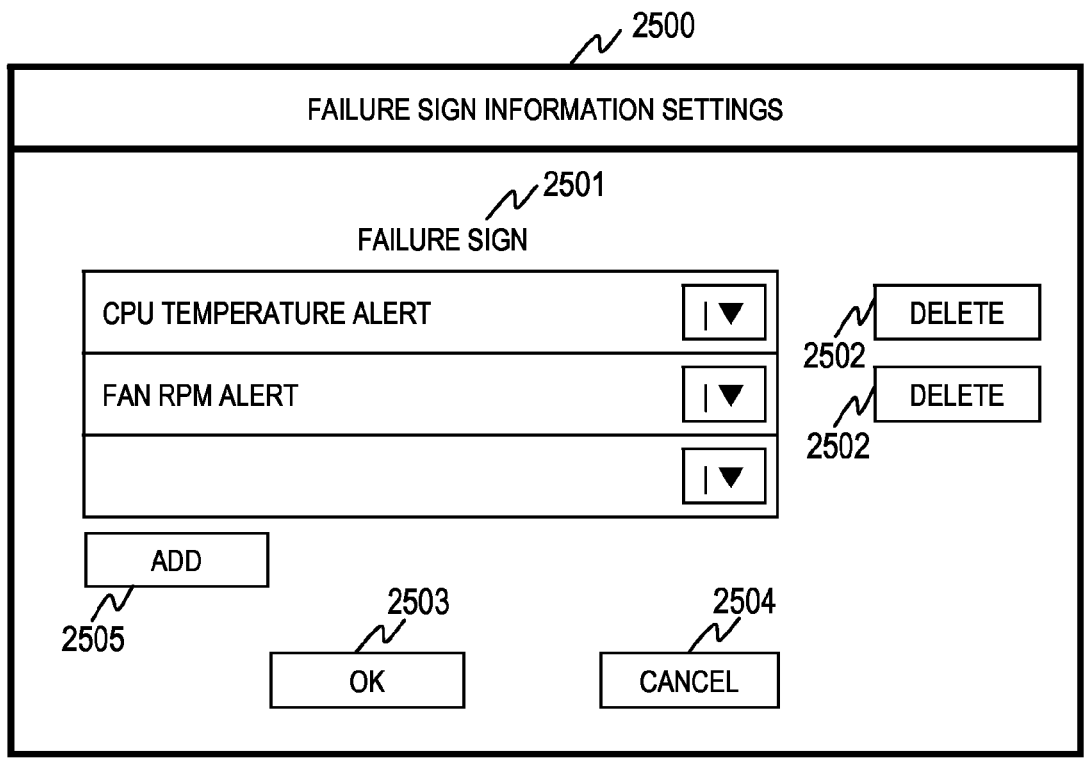
FIG. 25 is a diagram illustrating an example of a GUI for setting details of the failure sign information according to the third embodiment of this invention.
FIG. 26 is an explanatory diagram illustrating an example of the information held in the task management module according to the third embodiment of this invention.

FIG. 26 illustrates an example of the information held in the task management module 234. A column 2600 stores an identifier for identifying the server apparatus 110. Specifically, the column 2600 stores the host name which is set to the operating system running on the server apparatus 110, an IP address, a universally unique identifier (UUID) which is set to the server apparatus 110, or the like. A column 2601 stores an identifier for identifying the tasks running on the respective server apparatus 110. Specifically, the column 2601 stores a name of the task which is defined by the user (or system administrator).

Figure 3:
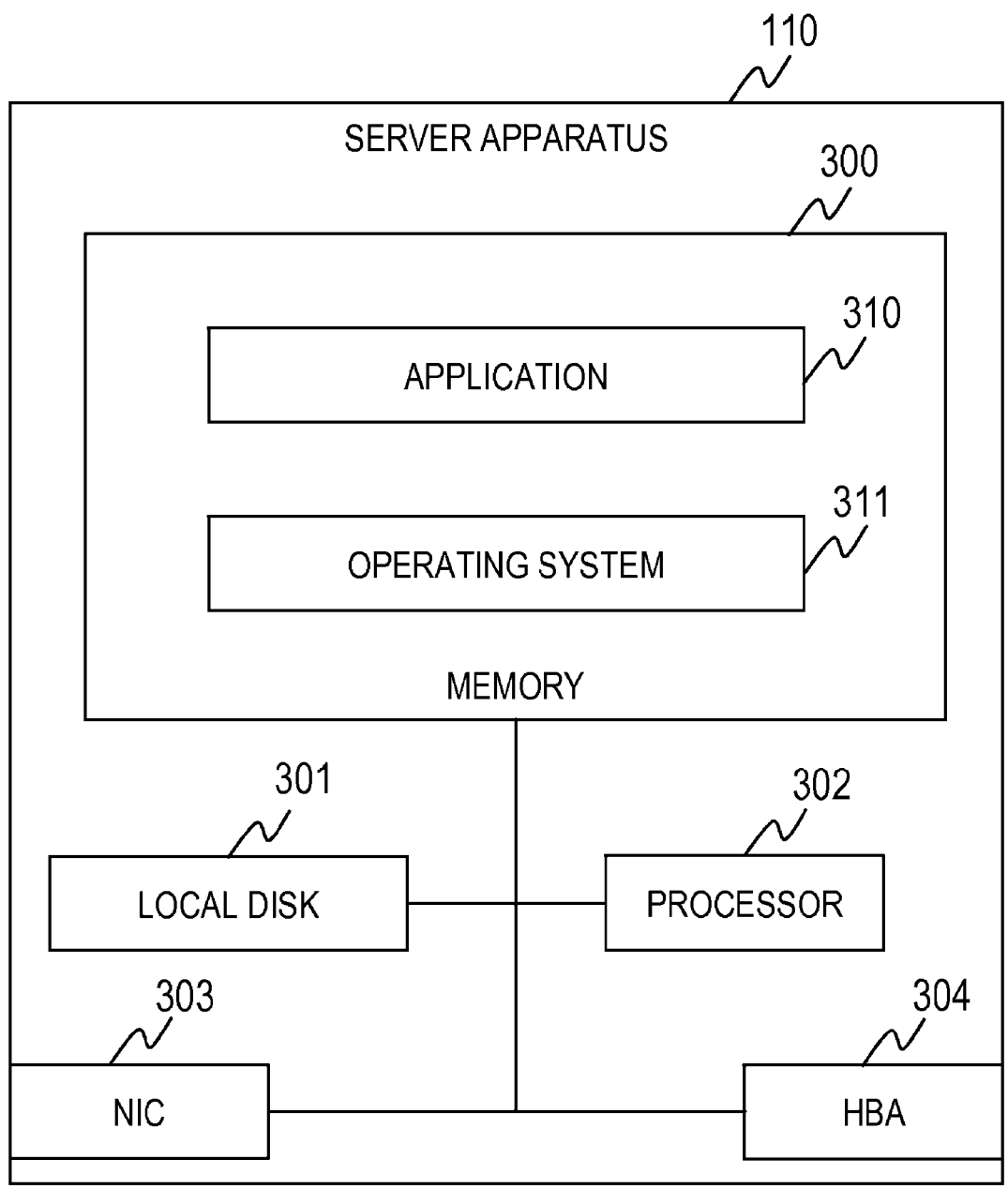
FIG. 3 is a block diagram illustrating a configuration of the server apparatus according to the first embodiment of this invention.

FIG. 3 is a block diagram illustrating a configuration of the server apparatus 110. The server apparatus 110-A and 110-B stored in the server chassis 112 have the same configuration. The server apparatus 110 includes a memory 300, a local disk 301, a processor (CPU) 302, an NIC 303, and an HBA 304. The local disk 301 is used as an auxiliary storage device. It should be noted that the server apparatus 110 may use a flash memory or the like as the auxiliary storage device. Further, the server apparatus 110 may include a plurality of NICs and a plurality of HBAs.

The memory 300 retains a program for putting an operating system 311 into operation. In the server apparatus 110, the processor 302 executes the operating system 311 and a program such as an application (task) 310 which are loaded on the memory 300.

Further, the server apparatus 110 includes a baseboard management controller (BMC) (not shown), and in accordance with an instruction from the SVP 111, can control the power supply and monitor hardware, for example, the temperature of the processor 302 and the fan rpm.

Still further, a virtualization system may be put into operation in the server apparatus 110. A configuration of the server apparatus 110 to be used in a case where the virtualization system is included therein is described below with reference to FIG. 4.

Figure 4:
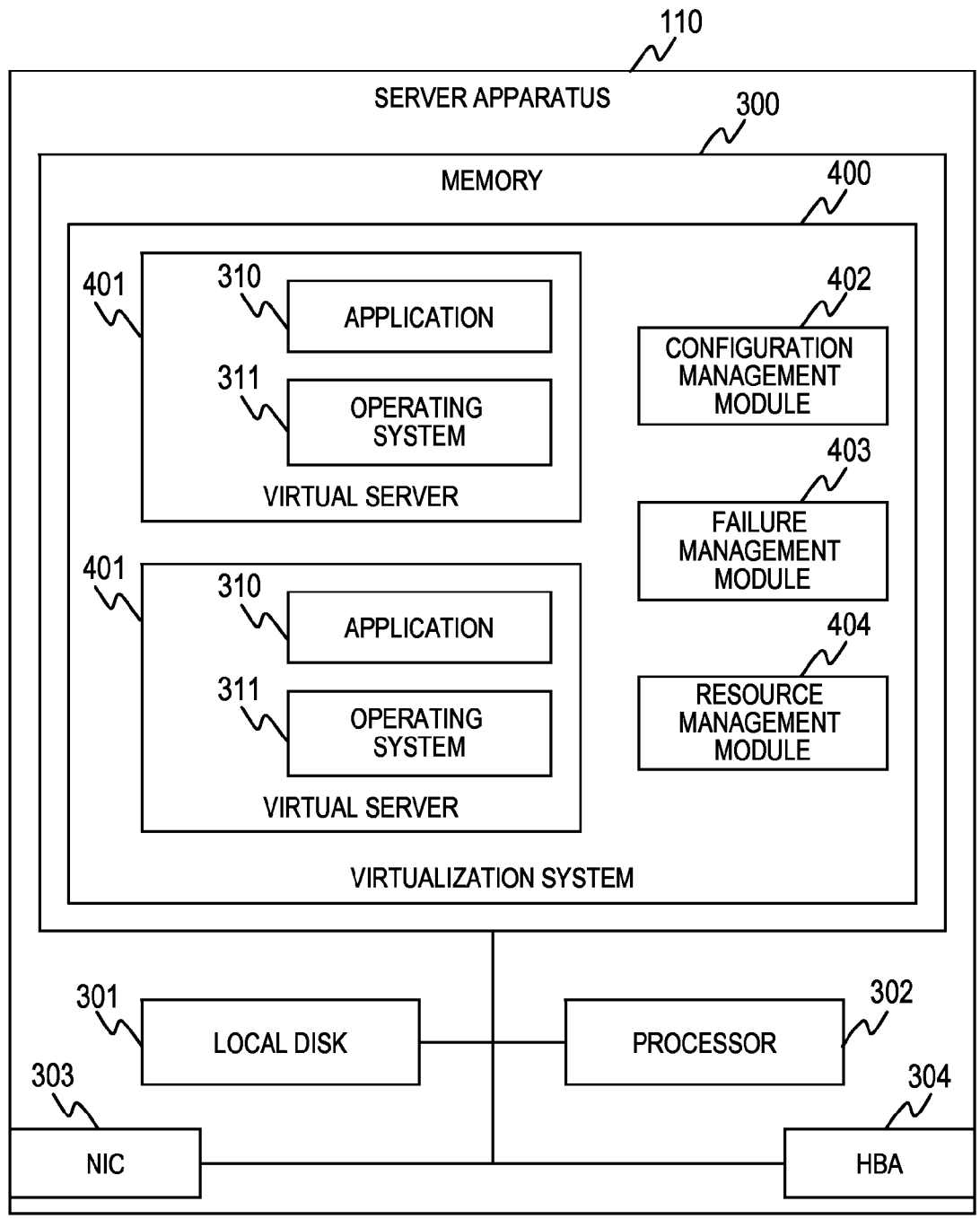
FIG. 4 illustrates the configuration of the server apparatus including a virtualization system according to the first embodiment of this invention.

FIG. 4 illustrates the configuration of the server apparatus 110 to be used in a case where the virtualization system is included therein. The memory 300 retains a program for putting a virtualization system 400 into operation. As the virtualization system 400, for example, a hypervisor or a virtual machine monitor (VMM) can be adopted. In the virtualization system 400, virtual servers 401, a configuration management module 402, a failure management module 403, and a resource management module 404 are put into operation.

The virtual server 401 is a logical computer which emulates a physical computer, and uses a virtual resource allocated by the virtualization system 400 to put an operating system (OS) 311 and a program such as an application 310 into operation in the virtual server 401.

The configuration management module 402 collects configuration information on the virtualization system 400 and the respective virtual servers 401 (such as host name and virtual server name), formats the collected information, and transmits the formatted information to the management server apparatus 100.

The failure management module 403 detects a failure which has occurred in the server apparatus 110 and the virtualization system 400 (such as CPU temperature rise and abnormality in fan rpm), formats information indicating details of the failure, and transmits the formatted information to the management server apparatus 100.

The resource management module 404 measures load information on the server apparatus 110 and the virtual server 401 (such as CPU usage rate and memory usage amount), formats current load information, and transmits the formatted load information to the management server apparatus 100. It should be noted that the information transmitted to the management server apparatus 100 by the resource management module 404 may include information measured in the past.

Figure 5:
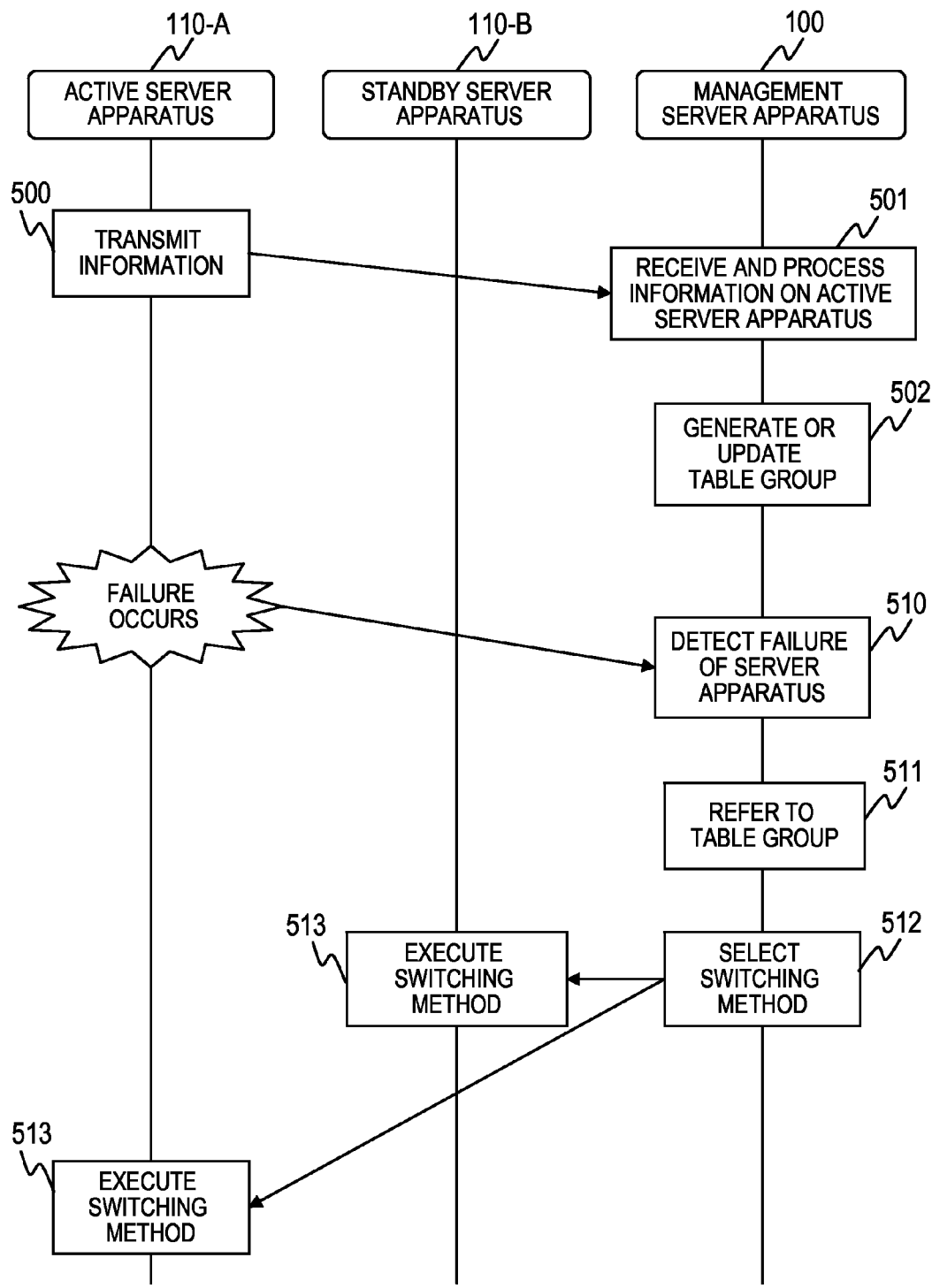
FIG. 5 is a sequence diagram illustrating an example of processing executed among an active server apparatus, a standby server apparatus, and the management server apparatus according to the first embodiment of this invention.

FIG. 5 is a sequence diagram illustrating an example of processing executed among the active server apparatus 110-A, the standby server apparatus 110-B, and the management server apparatus 100. The active server apparatus 110-A transmits to the management server apparatus 100, via the OS 311 or the virtualization system 400 running on the active server apparatus 110-A, the configuration information, failure information, and resource information on the active server apparatus 110-A and the virtualization system 400 running on the active server apparatus 110-A (Processing 500). It should be noted that Processing 500 is executed repeatedly at predetermined cycles. Further, the BMC (not shown) of the server apparatus 110 may transmit the configuration information, the failure information, and the resource information to the management server apparatus 100.

The management server apparatus 100 receives the information transmitted from the active server apparatus 110, and notifies the failure management module 230, the configuration management module 231, and the resource management module 232 included in the server management module 200 of details of the information (Processing 501).

The management server apparatus generates or updates details of the task requirement table 220 and the switching level table 221 of the table group 102 based on the information stored in the failure management module 230, the configuration management module 231, the resource management module 232, and the log management module 233 (Processing 502).

With the detection of the failure of the active server apparatus 110 and the like as a trigger (Processing 510), the management server apparatus 100 refers to the table group 102 (Processing 511), and selects, based on the information referred to, the switching method (or switching pattern) for the active server apparatus 110 in which the failure has occurred (Processing 512). Based on the switching method selected in Processing 512, the management server apparatus 100 executes switching of controlling the standby server apparatus 110-B to take over a task of the active server apparatus 110-A (Processing 513). The switching between the server apparatus 110 is realized by first stopping a task (second task) provided by (or executed by) the standby server apparatus 110-B based on the selected switching method, and then controlling the standby server apparatus 110-B to provide the task (first task) which has been provided by the active server apparatus 110-A.

It should be noted that in the description of this embodiment, the failure of the active server apparatus 110 (such as server down due to hardware fault) is used as the trigger detected in Processing 510, but maintenance of hardware constituting the active server apparatus 110, event notification from hardware or software, or information which is set by the user through a graphical user interface (GUI) realized by the input device 150 and the output device 151 may be used as the trigger.

FIG. 6 is an explanatory diagram illustrating an example of the switching level table 221. The switching level table 221 is generated or updated by the switching level table generation module 210, and retains information on the switching method (or switching pattern) for the server apparatus 110 and characteristics thereof. A level 601 is information which is obtained by expressing a non-numerical item such as the degree of safety of the switching method in a numerical value and which is used for comparison. It should be noted that in the description of this embodiment, the information of the level 601 is the degree of safety, which is described later, but another kind of information may be used. The degree of safety is information which is determined by the management server apparatus 100 for each switching pattern based on consumption of hardware, task continuity, data corruption, and the like in a case where switching of system is executed on the running standby server apparatus 110-B. In this embodiment, the switching pattern having a larger numerical value of the degree of safety can take over the task of the active server apparatus 110-A while suppressing an influence on the task of the standby server apparatus 110-B.

The level 601 stores a value which is determined by the management server apparatus 100 based on details of a switching method characteristic table 900, a control target rate table 901, a resource release rate table 902, and a task reboot rate table 903 of FIG. 9, which are described later. The switching method (or switching pattern) 602 stores an identifier for identifying the switching method (switching pattern) for controlling the standby server apparatus 110-B to take over the task of the active server apparatus 110-A. Specifically, the switching method 602 stores a name of the switching method which is defined by the user (or system administrator). A column 603 stores the required time 603 which is required for executing each switching method. The required time 603 is determined by the management server apparatus 100 based on the information of the log management module 233 and information which is set by the user through a graphical user interface (GUI) realized by the input device 150 and the output device 151.

FIG. 7 is an explanatory diagram illustrating an example of the task requirement table 220. The task requirement table 220 stores a switching time requirement determined based on an SLA such as a task-down allowed time for switching between the server apparatus 110. A column (task identifier) 701 stores an identifier for identifying the task executed in the server apparatus 110. As this identifier, an identifier associated with the task identifier 2601 retained by the task management module 234 is used. The column (switching time requirement) 702 stores a stop time allowed to switch the task from the active server apparatus 110-A to the standby server apparatus 110-B. For example, in a case where the column 702 has a value of 60 seconds, the switching method (or switching pattern) having a required time exceeding 60 seconds is not allowed under the task requirement. It should be noted that in the description of this embodiment, a unit for the column 702 is in seconds, but another unit may be used. Further, the column 702 may have a "null" value (there is no particular requirement) in a case where there is no provision regarding the stop time which is defined between a provider and a client who is provided with the task. Still further, the task requirement table 220 may be set in advance by the administrator or other person.

Figure 8:
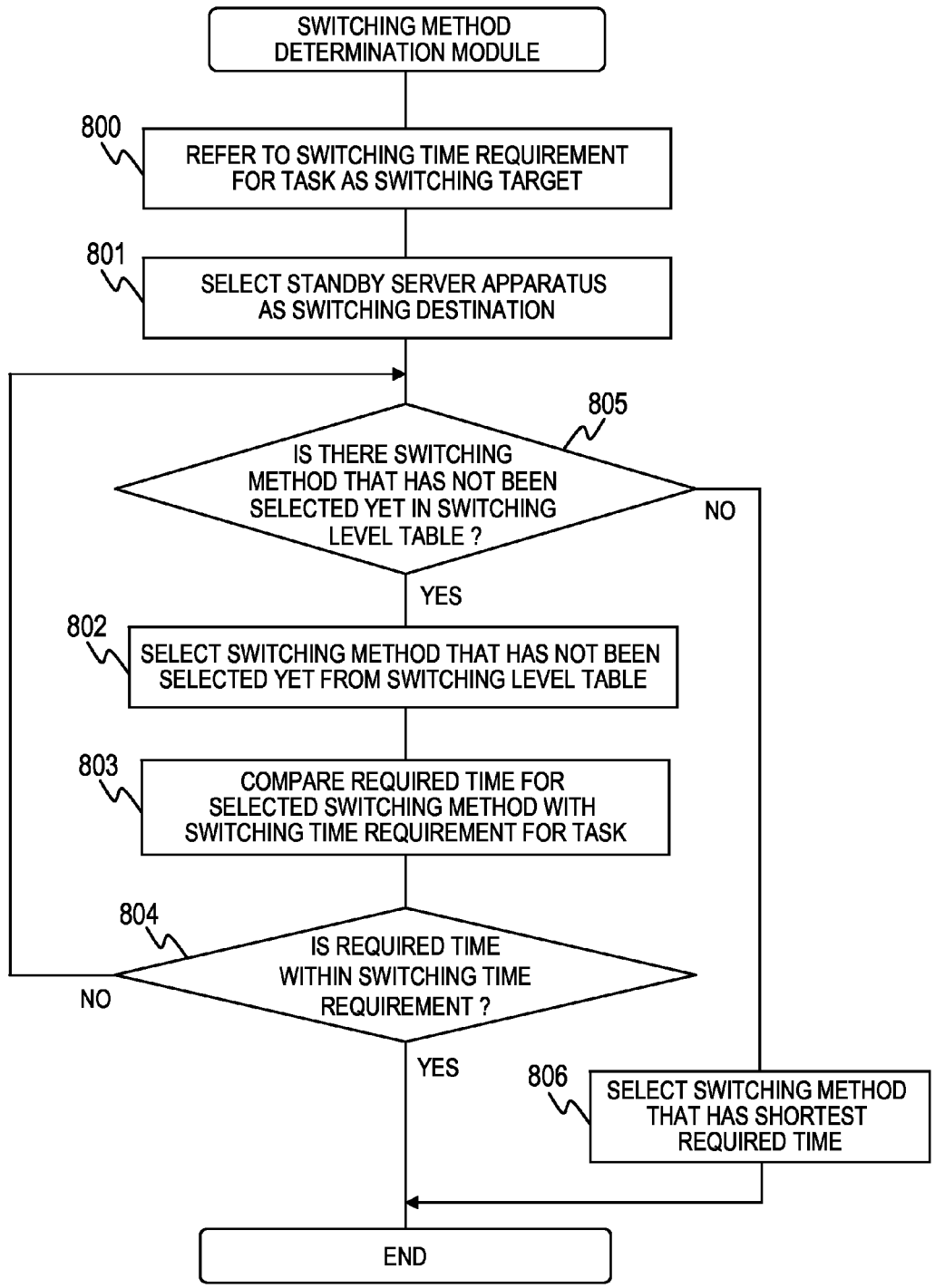
FIG. 8 is a flowchart illustrating an example of processing executed by a switching method determination module according to the first embodiment of this invention.

FIG. 8 is a flowchart illustrating an example of processing executed by the switching method determination module 213 included in the failure recovery management module 101. The switching method determination module 213 is put into operation when the failure recovery management module 101 determines the switching method (or switching pattern) (Processing 512 of FIG. 5). The switching method determination module 213 refers to the task requirement table 220 regarding the task executed on the server apparatus 110-A of the active system as a switching target to refer to the switching time requirement 702 of the task as a switching target. The task as a switching target is a task associated with the active server apparatus 110-A in which the management server apparatus 100 has detected a failure. In a case where the virtualization system 400 runs on the active server apparatus 110-A so that a plurality of tasks are associated with the active server apparatus 110-A, the switching method determination module 213 refers to the switching time requirement 702 having the smallest value from among the switching time requirements 702 of the plurality of tasks (Step 800).

The switching method determination module 213 selects the standby server apparatus 110-B as a switching destination of the active server apparatus 110-A. In a case where there are a plurality of standby server apparatus 110-B, the switching method determination module 213 refers to a running state of each standby server apparatus 110-B from the resource management module 232, and selects the standby server apparatus 110-B from among the server apparatus 110 that are not running or that are not selected as the switching destination of another active server apparatus (not shown). It should be noted that the server apparatus 110 may be selected as the switching destination based on information (such as priority and the standby server apparatus which is directly specified by the user) which is set by the user through a graphical user interface (GUI) realized by the input device 150 and the output device 151 (Step 801).

The switching method determination module 213 determines whether there is a switching method 602 that has not been selected yet in the switching level table 221 in this processing, and in a case where there is a switching method 602 that has not been selected yet, the switching method determination module 213 proceeds to Step 802, and in a case where all the switching methods 602 have been selected, proceeds to Step 806 (Step 805).

The switching method determination module 213 selects from the switching level table 221 the switching method 602 that has not been selected yet in this processing and has the highest level 601 (has the largest value) (Step 802). The switching method determination module 213 compares the required time 603 for the switching method 602 selected in Step 802 with the switching time requirement 702 of the task referred to in Step 800 (Step 803).

In a case where the required time 603 is within the switching time requirement 702 as a result of the comparison in Step 803, the switching method determination module 213 determines that even when the task is down due to execution of the switching method 602 selected in Step 802, the down complies with the task requirement, and the switching method determination module 213 ends its processing. In a case where the required time 603 is not within the switching time requirement 702, the switching method determination module 213 determines that the switching method cannot be used under the task requirement, and proceeds to Step 805 (Step 804). Step 806 is processing executed in a case where there is no switching method 602 that satisfies the switching time requirement 702. In Step 806, the switching method determination module 213 selects the switching method 602 that has the shortest required time 603.

Through the above-mentioned processing, the switching time requirement 702 allowed for the task as the switching target and the server apparatus 110-B of the standby system as the switching destination are first selected. Then, the processing in Steps 802, 803, 804, and 805 is executed by the number of entries of the switching level table 221 so that the switching method 602 that satisfies the switching time requirement 702 and has the largest value of the level 601 is selected from among the switching methods 602 (or switching patterns). Further, in a case where the number of times that the determination in Step 804 results in "NO" exceeds the number of entries of the switching level table 221, the switching method 602 that has the shortest required time 603 can be selected.

FIG. 9 is an explanatory diagram illustrating a configuration of the switching information table group 222. The switching information table group 222 includes the switching method characteristic table 900, the control target rate table 901, the resource release rate table 902, and the task reboot rate table 903. The switching information table group 222 is used for determination as to the level 601 stored in the switching level table 221.

FIG. 10 is an explanatory diagram illustrating a configuration of the switching method characteristic table 900. The switching method characteristic table 900 stores information on characteristics of operation executed by the standby server apparatus 110-B and an influence on the task that is currently running on the standby server apparatus 110-B when each switching method (switching pattern) is executed. The switching method characteristic table 900 is a table which is set in advance by the user or other person.

A column (switching method) 1000 stores an identifier for identifying the switching method for the server apparatus 110. Specifically, the column 1000 stores the name of the switching method which is defined by the user (or system administrator). The column 1001 stores information as a determination element for information indicated by the level 601 (in this embodiment, the degree of safety). In other words, the column 1001 stores information obtained by setting, for each item of control, details of control which is executed on the standby server apparatus 110-B when the switching method 1000 is executed.

The column 1001 includes, as sub-columns (items of control), the control target 1010, a resource release method 1011, and a task reboot 1012. The control target 1010 is a constituent element included in the standby server apparatus 110-B (such as OS, hardware, and the virtualization system) as a transmission destination of a control command when the switching method (switching pattern) 1000 is executed. The resource release method 1011 indicates a method of releasing a resource of the standby server apparatus 110-B in order to allocate the task running on the active server apparatus 110-A when the switching method 1000 is executed (such as stopping of the server apparatus and changing of a resource allocation rate). The task reboot 1012 indicates whether the reboot of the task running on the standby server apparatus 110-B is required when the switching method 1000 is executed.

FIG. 11 is an explanatory diagram illustrating a configuration of the control target rate table 901. The control target rate table 901 shows information for associating the control target 1010 with the information indicated by the level 601 (in this embodiment, the degree of safety). The control target rate table 901 is a table which is set in advance by the user or other person.

A column 1100 stores an identifier for associating the control target rate table 901 with the control target 1010. A column 1101 stores information for comparing pieces of information indicated by the level 601 (the degrees of safety in this embodiment) with one another among records of the column 1100. For example, if FIG. 11 is taken as an example, as compared with the degree of safety obtained in a case where a control command such as a command to turn the power off is transmitted to hardware, the degree of safety is higher in a case where a control command such as a command to shut down is transmitted to software such as the OS and the virtualization system because the load imposed on the hardware can be reduced. It should be noted that in a case where the power of hardware is forcibly turned off, a trouble, for example, a case where the management server apparatus 100 cannot recognize the server apparatus 110 in a case where the hardware is energized again, may occur. Therefore, the degree of safety of the switching pattern (switching method) including a procedure of forcibly turning off the power of hardware is set low.

FIG. 12 illustrates a configuration of the resource release rate table 902. The resource release rate table 902 shows information for associating the resource release method 1011 with the information indicated by the level 601 (in this embodiment, the degree of safety). The resource release rate table 902 is a table which is set in advance by the user or other person.

A column 1200 stores an identifier for associating the resource release rate table 902 with the resource release method 1011. A column 1201 stores information for comparing pieces of information indicated by the level 601 (in this embodiment, the degrees of safety) with one another among records of the column 1200. For example, if FIG. 12 is taken as an example, as compared with the degree of safety obtained in a case where the resource allocation rate is changed so that part of the standby server apparatus 110-B is allocated to the task running on the active server apparatus 110-A, the degree of safety is higher in terms of task continuity in a case where the standby server apparatus 110-B is stopped so that the entire standby server apparatus 110-B is allocated to the task running on the active server apparatus 110-A because a necessary resource can be prepared.

FIG. 13 is an explanatory diagram illustrating a configuration of the task reboot rate table 903. The task reboot rate table 903 shows information for associating the task reboot 1012 with the information indicated by the level 601 (in this embodiment, the degree of safety). The task reboot rate table 903 is a table which is set in advance by the user or other person.

A column 1300 stores an identifier for associating the task reboot rate table 903 with the task reboot 1012. A column 1301 stores information for comparing pieces of information indicated by the level 601 (in this embodiment, the degrees of safety) with one another among records of the column 1300. For example, if FIG. 13 is taken as an example, as compared with the degree of safety obtained in a case where the task reboot is required, the degree of safety is higher in terms of data loss in a case where the task reboot is not required.

Figure 14:
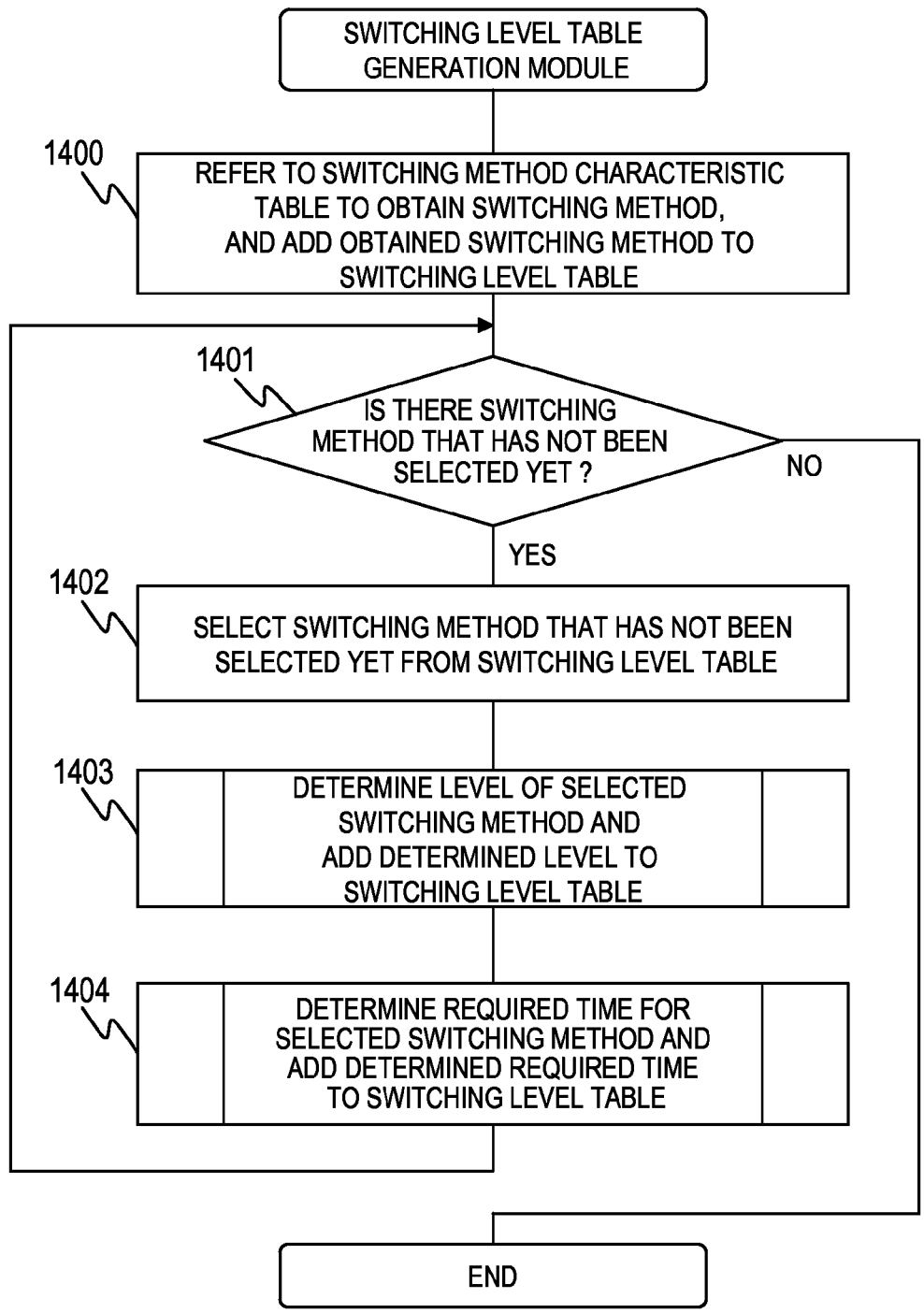
FIG. 14 is a flowchart illustrating an example of processing executed by the switching level table generation module according to the first embodiment of this invention.

FIG. 14 is a flowchart illustrating an example of processing executed by the switching level table generation module 210. This processing is executed in Processing 502 of FIG. 5.

The switching level table generation module 210 is put into operation when the failure recovery management module 101 generates the switching level table 221 (Processing 502). The switching level table generation module 210 refers to the switching method characteristic table 900 to obtain the switching method 1000, and adds the obtained switching method to the switching method 602 of the switching level table 221 (Step 1400).

The switching level table generation module 210 determines whether there is a switching method that has not been selected yet in this processing from among the switching methods added in Step 1400, and in a case where there is a switching method that has not been selected yet, the switching level table generation module 210 proceeds to Step 1402, and in a case where there is no switching method that has not been selected yet, ends the processing (Step 1401). It should be noted that the above-mentioned determination is performed by providing a flag or the like (not shown) to the switching level table 221 so that the flag is set when the switching method 602 is selected.

The switching level table generation module 210 selects one switching method that has not been selected yet in this processing from among the switching methods 602 stored in the switching level table 221 (Step 1402). The switching level table generation module 210 determines the level of the switching method 602 selected in Step 1402 and adds the determined level to the level 601 of a corresponding record of the switching level table 221 (Step 1403). A flowchart of detailed processing executed in Step 1403 is illustrated in FIG. 15.

Figure 16:
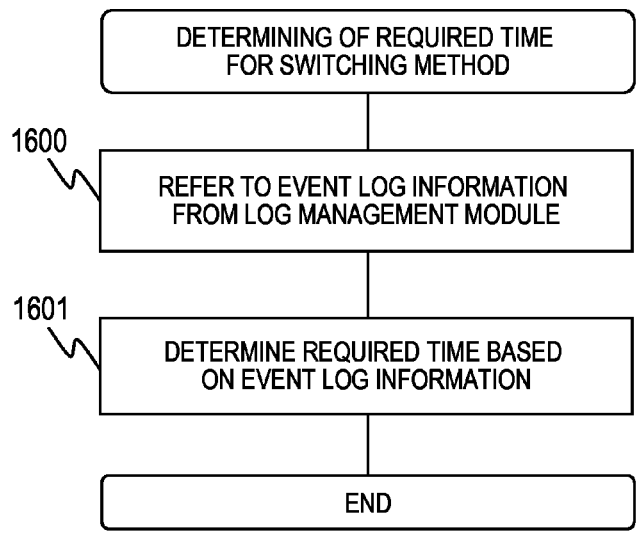
FIG. 16 is a flowchart illustrating processing of determining a required time for a switching method according to the first embodiment of this invention.

The switching level table generation module 210 determines the required time for the switching method 602 selected in Step 1402, adds the determined required time to required time 603 of a corresponding record of the switching level table 221, and proceeds to Step 1401 (Step 1404). A flowchart of detailed processing executed in Step 1404 is illustrated in FIG. 16.

Figure 15:
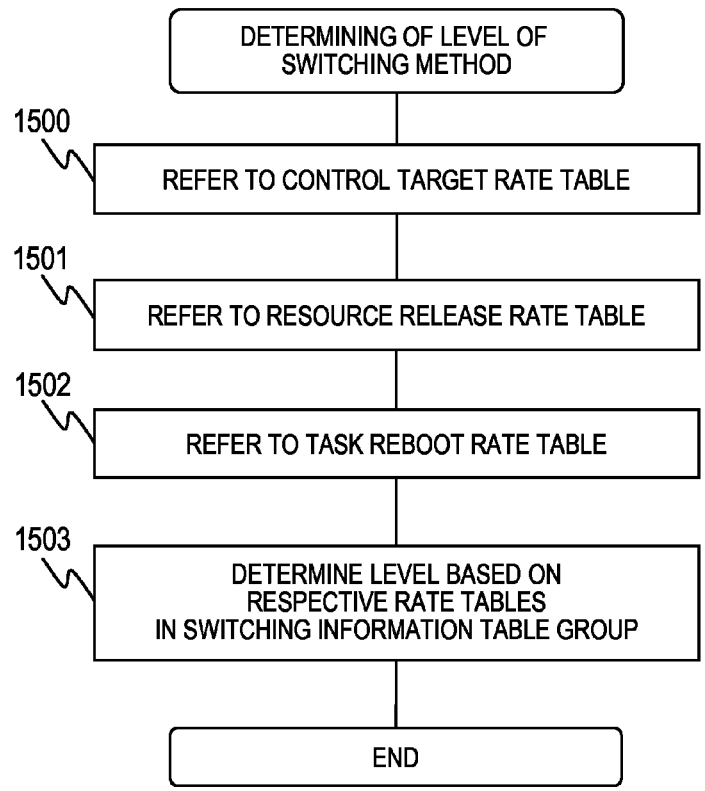
FIG. 15 is a flowchart illustrating processing of determining the level of the switching method according to the first embodiment of this invention.

FIG. 15 is a flowchart illustrating processing of determining the level 601 of the switching method 602, which is executed in Step 1403 of FIG. 14. In Step 1500, the switching level table generation module 210 reads the control target 1010 corresponding to the selected switching method 602 from the switching method characteristic table 900 of FIG. 10, and refers to the rate 1101 stored in the control target rate table 901 of FIG. 11.

In Step 1501, the switching level table generation module 210 reads the resource release method 1011 corresponding to the selected switching method 602 from the switching method characteristic table 900 of FIG. 10, and refers to the rate 1201 of the resource release rate table 902.

In Step 1502, the switching level table generation module 210 reads the task reboot 1012 of the selected switching method 602 from the switching method characteristic table 900 of FIG. 10, and refers to the rate 1301 of the task reboot rate table 903.

In Step 1503, based on the pieces of information referred to in Steps 1500, 1501, and 1502, the switching level table generation module 210 determines the level 601 of the switching level table 221. It should be noted that in the description of this embodiment, the determination method in Step 1503 is adding the rate 1101, the rate 1201, and the rate 1301, but another determination method such as using the largest value among the rates and using the order in the switching level table 221 (for example, the order is two in a case where the value obtained by the above-mentioned addition is the second largest in the switching level table 221) may be used.

FIG. 16 is a flowchart illustrating processing of determining the required time 603 for the selected switching method 602, which is executed in Step 1404 of FIG. 14. In Step 1600, the switching level table generation module 210 refers to event log information indicating an execution history such as start and end of the above-mentioned selected switching method 602 from the log management module 233.

In Step 1601, the switching level table generation module 210 determines the required time based on the event log information referred to in Step 1600. It should be noted that in the description of this embodiment, the determination method in Step 1601 is obtaining the difference between the most recent end time and the most recent start time of the switching method 602 (switching pattern) selected in Step 1402, but another determination method, for example, obtaining the worst value or an average value of differences regarding the last N executions, may be used. It should be noted that information on the switching method 602 (switching pattern) is acquired from the event log information by comparing the identifier of the switching method selected in Step 1402 and the identifier of the switching method 602 (switching pattern) included in the event log information with one another.

FIG. 17 illustrates an example of a graphical user interface (GUI) as an example of a user interface (UI) which is provided by the failure recovery management module 101 in order to enable the user to set details of the switching level table 221. This GUI is displayed on the output device 151 coupled to the management server apparatus 100, a display device of another terminal coupled to the management server apparatus 100 via the network switch 130, or the like by using a browser, dedicated program, text, or the like.

On a switching level information settings window 1700, switching level information, buttons for operation, and the like are displayed. The switching level information displayed on the window 1700 is based on details of the switching level table 221.

In a level 1701, information stored in the level 601 is displayed. In a switching method 1702, information stored in the switching method 602 is displayed. In a required time 1703, information stored in the column 603 is displayed. The user inputs values to the level 1701 and the required time 1703. The user clicks a button 1704 to update settings, and clicks a button 1705 to cancel the settings. In a case where the button 1704 is clicked, the failure recovery management module 101 reflects information input to the level 1701 and the required time 1703 in the switching level table 221.

FIG. 18 illustrates an example of a graphical user interface (GUI) as an example of a user interface (UI) which is provided by the failure recovery management module 101 in order to enable the user to set details of the task requirement table 220. This GUI is displayed on the output device 151 coupled to the management server apparatus 100, the display device of another terminal coupled to the management server apparatus 100 via the network switch 130, or the like by using the browser, dedicated program, text, or the like.

On a task requirement information settings window 1800, task requirement information, buttons for operation, and the like are displayed. The task requirement information displayed on the window 1800 is based on details of the task requirement table 220. In a task 1801, information stored in the column 701 is displayed. In a switching time requirement 1802, information stored in the column 702 is displayed. The user inputs a value to the switching time requirement 1802. The user clicks a button 1803 to update settings, and clicks a button 1804 to cancel the settings. When the button 1803 is clicked, the failure recovery management module 101 reflects information input to the switching time requirement 1802 in the task requirement table 220.

Figures 19, 20:
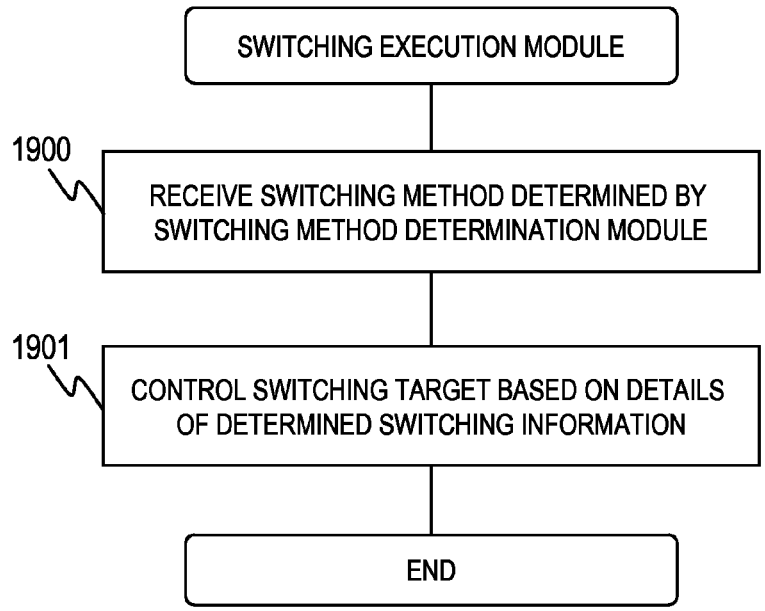
FIG. 19 is a flowchart illustrating an example of processing executed by the switching execution module according to the first embodiment of this invention.
FIG. 20 is a diagram illustrating a configuration of the failure restriction table according to a second embodiment of this invention.

FIG. 19 is a flowchart illustrating an example of processing executed by the switching execution module 212. The failure recovery management module 101 puts the switching execution module 212 into operation when selecting the switching method (Processing 512 of FIG. 5) after the processing by the switching method determination module 213.

The switching execution module 212 receives the switching method determined by the switching method determination module 213 from the failure recovery management module 101 (Step 1900). The switching execution module 212 controls the active server apparatus 110 and the standby server apparatus 110 based on the switching method received in Step 1900 (Step 1901). For example, in a case where the received switching method is forced power off, the switching execution module 212 transmits a power off command to hardware of the standby server apparatus 110-B, determines the power off, and then executes switching of system of the active server apparatus 110-A.

According to this embodiment, the failure recovery management module 101 determines based on the level the switching method (switching procedure) for the server for stopping the standby server apparatus 110-B as safely as possible at the time of server switching, and executes the server switching based on the determined switching method so that the task can be recovered. At the time of switching between the server apparatus 110, the task requirement, which is the restriction regarding a period of time until the standby system takes over the active system, can be satisfied, and the server apparatus 110-B of the standby system can be stopped as safely as possible, with the result that it is possible to prevent data on the tasks (development and test) which have been executed by the server apparatus 110-B of the standby system from being corrupted.

As described above, according to this embodiment, it is possible to determine the switching pattern for the server for stopping the server apparatus of the standby system as safely as possible at the time of server switching. In other words, while the resources of the computer system are effectively utilized by executing the tasks such as development and test in the standby server apparatus 110-B, when the failure occurs in the active server apparatus 110-A, it is possible to execute switching from the active system to the standby system while minimizing the influence on the task which has been executed in the standby server apparatus 110-B and satisfying the predetermined task condition.

Second Embodiment

In the above-mentioned first embodiment, a description is given of the method of switching a server, including the step of selecting the switching method based on the level 601 for each switching method and the requirement for the task as the switching target. In a second embodiment of this invention, a description is given of a method of switching a server, including a step of selecting a switching method by taking details of a failure which has occurred in the active server apparatus 110-A into consideration. In this embodiment, the failure restriction table 223 is newly used. Other configurations are the same as those of the first embodiment, and descriptions of those configurations and the steps are thus omitted.

FIG. 20 illustrates a configuration of the failure restriction table 223. The failure restriction table 223 is included in the table group 102 of FIG. 2, and shows a restriction to be used in a case where the switching method is determined with regard to details of the failure (cause of the failure) which has occurred in the active server apparatus 110-A (or the OS 311 and the virtualization system 400 running thereon) (for example, in a case where a temperature failure has occurred in the CPU (processor), migration means that overuses the CPU, such as virtual server migration, is not used heavily). A column 2000 stores an identifier for identifying the details of the failure. Specifically, a column 2000 stores a name defined by the user (or server administrator). A column 2001 indicates details of the restriction given by the failure on the determination of the switching method. If FIG. 20 is taken as an example, in a case where a network adapter failure has occurred and a network bandwidth decreases, the switching method is determined so that the switching method that imposes heavy load on the network, such as the virtual server migration, is not executed.

It should be noted that the cause of the failure can be identified based on a log or notification acquired by the management server apparatus 100 from the BMC, OS, or the like of the server apparatus 110. A publicly-known or well-known technology can be used for identifying the cause of the failure.

Figure 21:
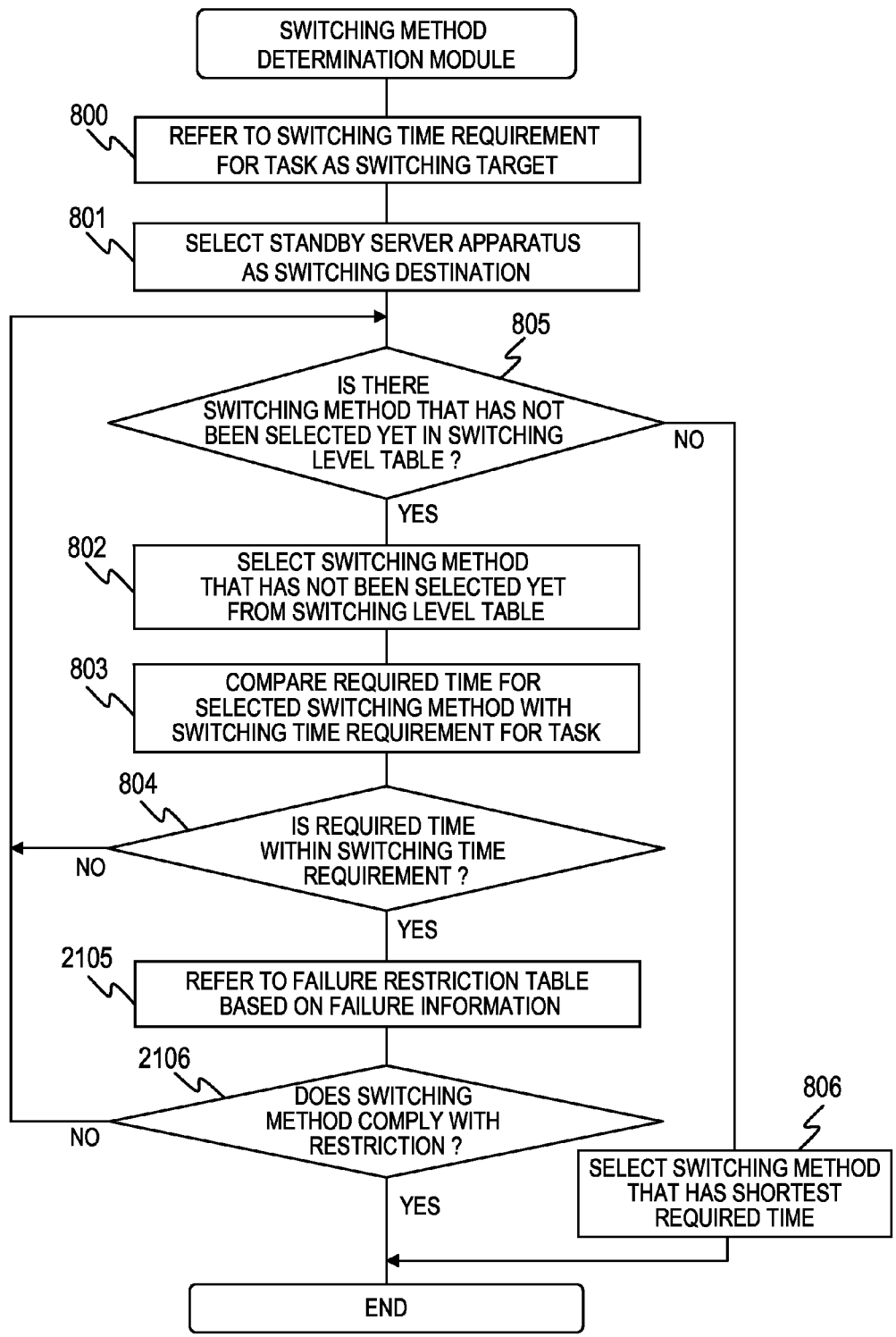
FIG. 21 is a flowchart illustrating an example of processing executed by a switching method determination module according to the second embodiment of this invention.

FIG. 21 is a flowchart illustrating processing executed by a switching method determination module 213 of the second embodiment. FIG. 21 is processing obtained by changing, for this embodiment, the processing executed by the switching method determination module 213 illustrated in FIG. 8 of the above-mentioned first embodiment. FIG. 21 is different from FIG. 8 in that Steps 2105 and 2106 are added. Other steps are the same as those of FIG. 8 of the above-mentioned first embodiment.

The switching method determination module 213 refers to the failure details 2000 of the failure restriction table 223 based on failure information on the active server apparatus 110-A received by the management server apparatus 100 (Step 2105). The switching method determination module 213 determines whether execution of the switching method selected in Step 802 complies with the restriction acquired in Step 2105 (Step 2106). On the other hand, in a case where the execution does not comply with the acquired restriction, the switching method determination module 213 proceeds to Step 805.

According to this embodiment, the failure recovery management module 101 can take the details of the failure which has occurred in the active server apparatus 110-A into consideration in determining the switching method for the server apparatus 110. As a result, it is possible to avoid problems in that the switching method for the server apparatus 110 induces a failure, and in that resources required for switching between the server apparatus 110 cannot be used due to the failure and the switching thus fails.

Third Embodiment

Figure 22:
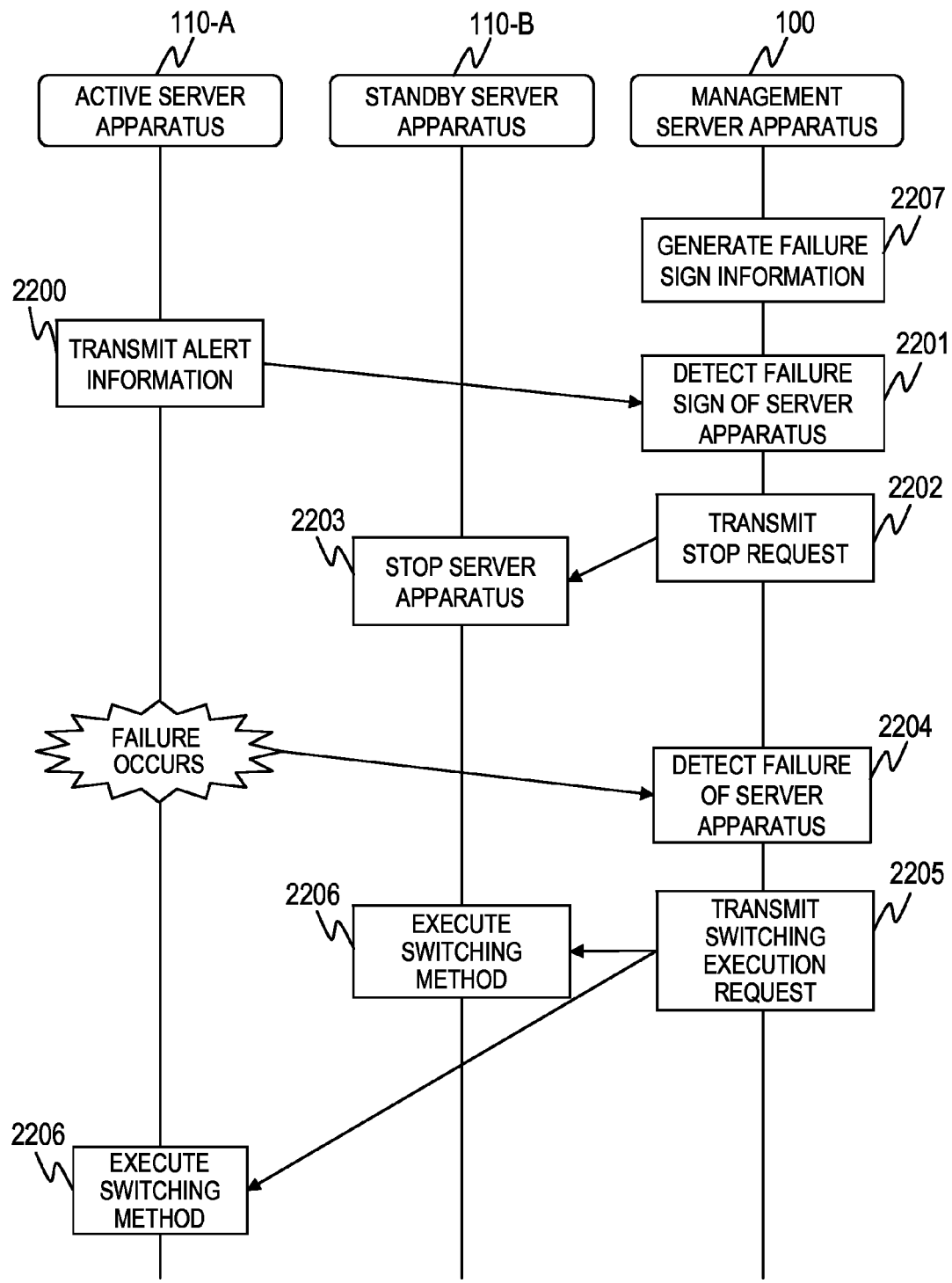
FIG. 22 is a sequence diagram illustrating an example of processing executed among an active server apparatus, a standby server apparatus and a management server apparatus according to a third embodiment of this invention.

In a third embodiment of this invention, a description is given of a method of switching a server based on detection of a failure sign of the active server apparatus 110-A as a characteristic method of switching a server. FIG. 22 illustrates an example of a sequence of processing executed among an active server apparatus 110-A, a standby server apparatus 110-B, and a management server apparatus 100 of the third embodiment. It should be noted that the processing of FIG. 22 is executed in addition to Processing 500 to Processing 502 illustrated in FIG. 5 of the above-mentioned first embodiment. Other configurations are the same as those of the above-mentioned first embodiment, and descriptions of those configurations and the steps are thus omitted.

The management server apparatus 100 generates the failure sign information table 224 based on information stored in the failure management module 230 and the log management module 233 of the server management module 200 (Processing 2207).

The active server apparatus 110 transmits to the management server apparatus 100 alert information (for example, CPU temperature rise, fan rpm rise, memory correcting error, and resource being scarce) on the server apparatus 110, or the OS 311 or the virtualization system 400 running thereon (Processing 2200). It should be noted that Processing 2200 is executed repeatedly at predetermined cycles.

The management server apparatus 100 receives the alert information transmitted from the active server apparatus 110-A, and detects a failure sign of the active server apparatus 110-A based on details of the alert information (Processing 2201). In a case of detecting the failure sign of the active server apparatus 110-A, the management server apparatus 100 transmits a stop command (such as command to shut down the OS) to the standby server apparatus 110-B (Processing 2202). In a case of receiving the stop command from the management server apparatus 100, the standby server apparatus 110-B stops the server apparatus 110-B based on details of the stop command (Processing 2203).

After that, in a case of the active server apparatus 110-A stops due to the failure occurrence, the management server apparatus 100 detects the failure of the active server apparatus 110-A (Processing 2204). After detecting the failure, the management server apparatus 100 starts switching from the active server apparatus 110-A to the standby server apparatus 110-B (Processing 2205). The active server apparatus 110 and the standby server apparatus 110 execute switching in response to the request from the management server apparatus 100 (Processing 2206).

Figure 23:
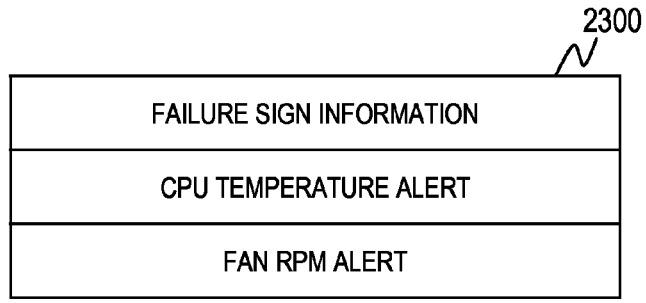
FIG. 23 is an explanatory diagram illustrating a configuration of the failure sign information table according to the third embodiment of this invention.

FIG. 23 is an explanatory diagram illustrating a configuration of the failure sign information table 224. The failure sign information table 224 is generated by the failure sign information table generation module 214 to be described below, and retains information for determining, by the failure recovery management module 101, the failure sign of the server apparatus 110. A column 2300 indicates information on the failure sign of the server apparatus 110. If FIG. 23 is taken as an example, in a case where the management server apparatus 100 receives state information on CPU temperature alert from the active server apparatus 110-A, the failure recovery management module 101 determines that a failure occurs in the active server apparatus 110-A in the future to stop the active server apparatus 110-A.

Figure 24:
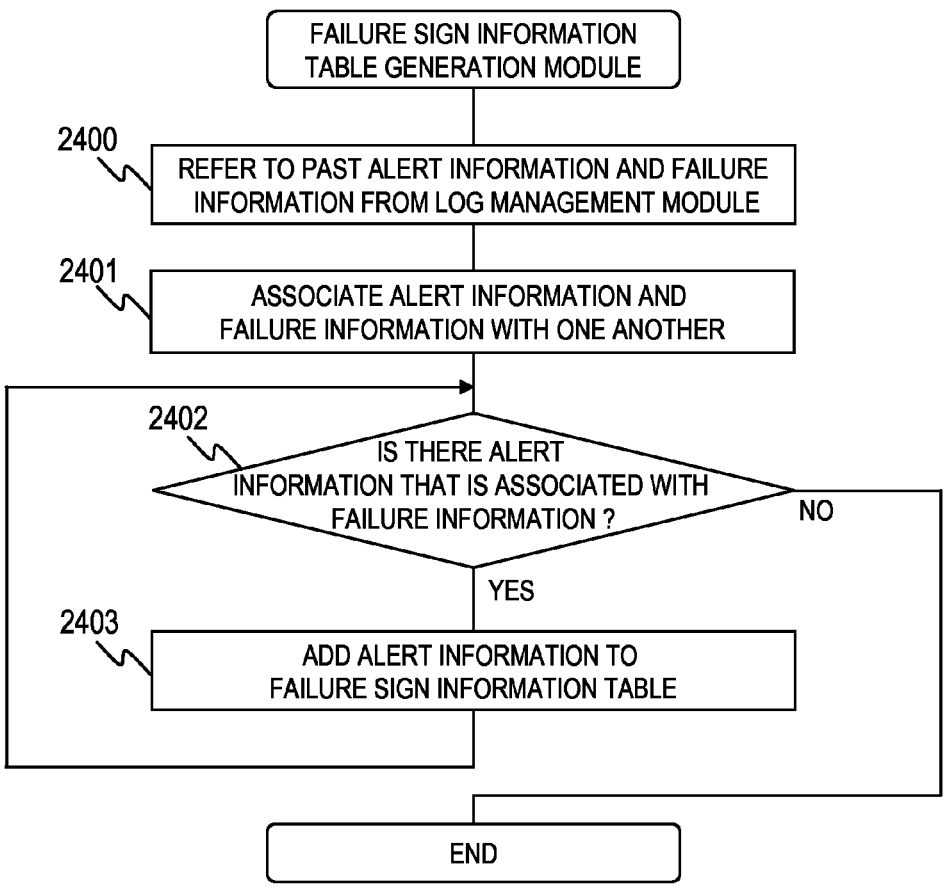
FIG. 24 is a flowchart illustrating an example of processing executed by the failure sign information table generation module according to the third embodiment of this invention.

FIG. 24 is a flowchart illustrating an example of processing executed by the failure sign information table generation module 214. The failure sign information table generation module 214 is put into operation when the failure recovery management module 101 generates the failure sign information (Processing 2207).

The failure sign information table generation module 214 refers to past alert information and failure information on the active server apparatus 110-A from the log management module 233 (Step 2400). The failure sign information table generation module 214 associates the alert information and the failure information which are referred to in Step 2400 with one another (Step 2401).

This association is performed based on parts that are directly associated with one another (for example, failure information on the CPU (processor) and alert information on the CPU (processor) are associated with one another), parts that are indirectly associated with one another (for example, when the alert information on the CPU is generated, a performance failure may occur in the OS, the virtualization system, and the application which are parts associated with the CPU), a reception time (for example, as reception times become closer, the association becomes stronger), and the like.

The failure sign information table generation module 214 determines whether there is alert information that is associated with the failure information in Step 2401, and in a case where there is alert information that is associated with the failure information, the failure sign information table generation module 214 proceeds to Step 2403, and in a case where there is no alert information that is associated with the failure information, ends the processing (Step 2402). The failure sign information table generation module 214 adds the alert information associated with the failure information in Step 2401 to the failure sign information table, and proceeds to Step 2402 (Step 2403).

FIG. 25 illustrates an example of a graphical user interface (GUI) as an example of a user interface (UI) which is provided by the failure recovery management module 101 in order to enable the user to set details of the failure sign information table 224. This GUI is displayed on the output device 151 coupled to the management server apparatus 100, the display device of another terminal coupled to the management server apparatus 100 via the network switch 130, or the like by using the browser, dedicated program, text, or the like.

On a failure sign information settings window 2500, failure sign information, buttons for operation, and the like are displayed. The failure sign information displayed on the window 2500 is based on details of the failure sign information table 224. In a failure sign 2501, information stored in the column 2300 is displayed. The user can select in the failure sign 2501 information to be treated as the failure sign based on information on a state of the server apparatus 110 which is stored in the management server apparatus 100. The user clicks a button 2505 to add a new failure sign 2501. The user clicks a button 2502 to delete an existing failure sign 2501. The user clicks a button 2503 to update settings, and clicks a button 2504 to cancel the settings. When the button 2503 is clicked, the failure recovery management module 101 reflects information input to the failure sign 2501 in the failure sign information table 224.

According to this embodiment, by detecting the failure sign of the active server apparatus and stopping the standby server apparatus in advance, it is possible to suppress an influence on the task running on the standby server apparatus at the time of switching between the servers. In other words, the failure recovery management module 101 detects the failure sign of the active server apparatus 110-A so that the standby server apparatus 110-B can be stopped before the failure actually occurs. As a result, it is possible to avoid problems such as forced stopping of the active server apparatus 110-A and the standby server apparatus 110-B due to the failure occurrence and corruption of data retained on the standby server apparatus 110-B due to the forced stopping.

While the present invention has been described in detail and pictorially in the accompanying drawings, the present invention is not limited to such detail but covers various obvious modifications and equivalent arrangements, which fall within the purview of the appended claims.

As described above, this invention is applicable to the computer system and the management server for switching to the server of the standby system when a failure occurs in the server of the active system. In particular, this invention is suitable for the computer system in which the tasks such as test and system development are allocated to the server of the standby system so as to effectively utilize computer resources of the computer system.

What is claimed is:

1. A method of switching an application server, for controlling to take over a first task provided by a first application server to a second application server, the method being executed by a management computer coupled to the first application server for providing the first task and the second application server for providing the second task,
the method including:
a first step of referring, by the management computer, to switching level information including switching patterns to be used at a time of switching the first task to the second application server, and setting a level of a degree of safety for each of the switching patterns;
a second step of referring, by the management computer, to the switching level information, and setting a switching time for the each of the switching patterns, which is required for switching the first task to the second application server;
a third step of referring, by the management computer, to task requirement information including a stop time for each first task which is allowed at the time of switching the first task to the second application server;
a fourth step of comparing, by the management computer, the stop time included in the referred task requirement information which is set to the first task and the switching time which is set to the each of the switching patterns included in the referred switching level information, and selecting one of the switching patterns having a switching time that is shorter than the stop time of the task requirement information which is set to the first task and having the level of the degree of safety that is highest among the switching patterns of the switching level information; and
a fifth step of stopping, by the management computer, the second task of the second application server by the selected one of the switching patterns, and then controlling the second application server to provide the first task.

2. The method of switching an application server according to claim 1, wherein:
the first step includes the steps of referring, by the management computer, to switching characteristic information including a plurality of control items on the second application server which are set for the each of the switching patterns of the switching level information and numeric information on each of the plurality of control items, obtaining the numeric information for calculating the level of the degree of safety for the each of the plurality of control items, and setting the level of the degree of safety of the each of the switching patterns based on the numeric information on the plurality of control items which are included in the each of the switching patterns; and
the second step includes the steps of referring, by the management computer, to log information in which a past record of a period of time which was required for past switching is stored for the each of the switching patterns, and setting the switching time.

3. The method of switching an application server according to claim 1, further including a sixth step of detecting, by the management computer, a failure of the first application server,
wherein the third step, the fourth step and the fifth step are executed with the detection of the failure of the first application server as a trigger.

4. The method of switching an application server according to claim 3, wherein the fourth step includes the steps of determining, by the management computer, a cause of the failure of the first application server; referring to failure restriction information including a switching pattern to be restricted for each cause of the failure; obtaining the switching pattern to be restricted corresponding to the identified cause of the failure; and selecting one of the switching patterns having the switching time, which is set to the each of the switching patterns of the switching level information, that is shorter than the stop time of the task requirement information which is set to the first task, and having the level of the degree of safety of the switching level information that is highest among the switching patterns other than the switching pattern to be restricted.

5. The method of switching an application server according to claim 1, further including a seventh step of detecting, by the management computer, a sign of a failure of the first application server,
wherein the third step, the fourth step and the fifth step are executed with the detection of the sign of the failure of the first application server as a trigger.

6. A management computer, which is coupled to a first application server for providing a first task and a second application server for providing a second task, the management computer comprising:
a processor;
a memory; and
a failure recovery module for controlling the second application server to take over the first task provided by the first application server to the second application server,
wherein the failure recovery module includes:
a switching level information generation module for setting switching patterns to be used at a time of switching the first task to the second application server, a level of a degree of safety for each of the switching patterns, and a switching time which is required for switching the first task to the second application server for the each of the switching patterns;
task requirement information included in a stop time which is allowed at the time of switching the first task to the second application server in advance;
a switching pattern selection module for comparing the stop time included in the task requirement information which is set to the first task and the switching time which is set to the each of the switching patterns included in switching level information, and selecting one of the switching patterns having a switching time that is shorter than the stop time of the task requirement information which is set to the first task and having the level of the degree of safety that is highest among the switching patterns of the switching level information; and
a switching execution module for stopping the second task of the second application server by the selected one of the switching patterns, and then controlling the second application server to provide the first task.

7. The management computer according to claim 6, wherein the switching level information generation module is configured to:
refer to switching characteristic information including a plurality of control items on the second application server which are set for the each of the switching patterns of the switching level information and numeric information on each of the plurality of control items, and obtain the numeric information for calculating the level of the degree of safety for the each of the plurality of control items;
set the level of the degree of safety of the each of the switching patterns based on the numeric information on the plurality of control items which are included in the each of the switching patterns; and
refer to log information in which a past record of a period of time which was required for past switching is stored for the each of the switching patterns, and set the switching time.

8. The management computer according to claim 6, further comprising a failure management module for detecting a failure of the first application server,
wherein the switching pattern selection module selects the one of the switching patterns as a trigger that the failure management module detects the failure of the first application server.

9. The management computer according to claim 8, wherein the switching pattern selection module is configured to:
determine a cause of the failure of the first application server detected by the failure management module;
refer to failure restriction information including a switching pattern to be restricted for each cause of the failure, and obtain the switching pattern to be restricted corresponding to the identified cause of the failure; and
select one of the switching patterns having the switching time, which is set to the each of the switching patterns of the switching level information, that is shorter than the stop time of the task requirement information which is set to the first task and having the level of the degree of safety of the switching level information that is highest among the switching patterns other than the switching pattern to be restricted.

10. The management computer according to claim 6, further comprising a failure management module for detecting a sign of the failure of the first application server,
wherein the switching pattern selection module selects the one of the switching patterns as a trigger that the failure management module detects the sign of the failure of the first application server.

11. A non-transitory machine-readable storage medium, containing at least one sequence of instructions for controlling a management computer, the management computer being coupled to a first application server for providing a first task and a second application server for providing a second task, and including a processor and a memory,
the instructions that, when executed, causes a management computer to execute:
a first procedure of referring to switching level information including switching patterns to be used at a time of switching the first task to the second application server, and setting a level of a degree of safety for each of the switching patterns;
a second procedure of referring to the switching level information, and setting a switching time for the each of the switching patterns, which is required for switching the first task to the second application server;
a third procedure of referring to task requirement information including a stop time for each first task which is allowed at the time of switching the first task to the second application server;
a fourth procedure of comparing the stop time included in the referred task requirement information which is set to the first task and the switching time which is set to the each of the switching patterns included in the referred switching level information, which are referred to, with one another, and selecting one of the switching patterns having a switching time that is shorter than the stop time of the task requirement information which is set to the first task and having the level of the degree of safety of the switching level information that is highest; and
a fifth procedure of stopping the second task of the second application server by the selected one of the switching patterns, and then controlling the second application server to provide the first task.

12. The non-transitory machine-readable storage medium according to claim 11, wherein:
the first procedure includes the steps of referring to switching characteristic information including a plurality of control items on the second application server which are set for the each of the switching patterns of the switching level information and numeric information on each of the plurality of control items are set, obtaining the numeric information for calculating the level of the degree of safety for the each of the plurality of control items, and setting the level of the degree of safety of the each of the switching patterns based on the numeric information on the plurality of control items which are included in the each of the switching patterns; and
the second procedure includes the steps of referring to log information in which a past record of a period of time which was required for switching is stored for the each of the switching patterns, and setting the switching time.

13. The non-transitory machine-readable storage medium according to claim 11, wherein:
the instructions further causes a management computer program controlling the processor to execute a sixth procedure of detecting a failure of the first application server; and
the third procedure, the fourth procedure and the fifth procedure are executed with the detection of the failure of the first application server as a trigger.

14. The non-transitory machine-readable storage medium according to claim 13, wherein the fourth procedure includes the steps of determining a cause of the failure of the first application server; referring to failure restriction information including a switching pattern to be restricted for each cause of the failure; obtaining the switching pattern to be restricted corresponding to the identified cause of the failure; and selecting one of the switching patterns having the switching time, which is set to the each of the switching patterns of the switching level information, that is shorter than the stop time of the task requirement information which is set to the first task, and having the level of the degree of safety of the switching level information that is highest among the switching patterns other than the switching pattern to be restricted.

15. The non-transitory machine-readable storage medium according to claim 11, wherein:
the instructions further causes a management computer program controlling the processor to execute a seventh procedure of detecting a sign of a failure of the first application server; and the third procedure, the fourth procedure and the fifth procedure are executed with the detection of the sign of a failure of the first application server as a trigger.

* * * * *